(12) United States Patent
Krall et al.

(10) Patent No.: US 9,661,709 B2
(45) Date of Patent: May 23, 2017

(54) INTEGRATED LED/OLED LIGHTING SYSTEM

(71) Applicant: Universal Display Corporation, Ewing, NJ (US)

(72) Inventors: Emory Krall, Philadelphia, PA (US); Jason Paynter, Bristol, PA (US)

(73) Assignee: Universal Display Corporation, Ewing, NJ (US)

(*) Notice: Subject to any disclaimer, the term of this patent is extended or adjusted under 35 U.S.C. 154(b) by 195 days.

(21) Appl. No.: 14/669,926

(22) Filed: Mar. 26, 2015

(65) Prior Publication Data

US 2015/0282269 A1 Oct. 1, 2015

Related U.S. Application Data

(60) Provisional application No. 61/971,654, filed on Mar. 28, 2014.

(51) Int. Cl.
| | | |
|---|---|---|
| *H05B 33/08* | (2006.01) |
| *F21V 7/00* | (2006.01) |
| *F21S 8/06* | (2006.01) |
| *F21Y 101/00* | (2016.01) |
| *F21Y 105/00* | (2016.01) |
| *F21Y 115/15* | (2016.01) |
| *F21Y 113/20* | (2016.01) |

(52) U.S. Cl.
CPC ............ *H05B 33/0845* (2013.01); *F21S 8/06* (2013.01); *F21V 7/0016* (2013.01); *H05B 33/0857* (2013.01); *F21Y 2101/00* (2013.01); *F21Y 2105/00* (2013.01); *F21Y 2113/20* (2016.08); *F21Y 2115/15* (2016.08); *Y02B 20/36* (2013.01)

(58) Field of Classification Search
CPC ...... F21S 8/06; F21V 7/0016; F21Y 2101/00; F21Y 2105/00; F21Y 2113/20; F21Y 2115/15; H05B 33/0845; H05B 33/0857; Y02B 20/36

See application file for complete search history.

(56) References Cited

U.S. PATENT DOCUMENTS

| | | |
|---|---|---|
| 4,769,292 A | 9/1988 | Tang et al. |
| 5,247,190 A | 9/1993 | Friend et al. |
| 5,703,436 A | 12/1997 | Forrest et al. |
| 5,707,745 A | 1/1998 | Forrest et al. |

(Continued)

FOREIGN PATENT DOCUMENTS

| | | |
|---|---|---|
| WO | 2008057394 | 5/2008 |
| WO | 2010011390 | 1/2010 |

OTHER PUBLICATIONS

Baldo, et al., "Highly efficient phosphorescent emission from organic electroluminescent devices", Nature, vol. 395, pp. 151-154, 1998.

(Continued)

*Primary Examiner* — Stephen F Husar
(74) *Attorney, Agent, or Firm* — Morris & Kamlay LLP

(57) ABSTRACT

A light unit is provided that includes a frame having a top face and a bottom face, with the bottom face at least partially overlapping the top face in some configurations. A non-OLED light source is disposed on the top face and configured to emit light away from the top face. An OLED light source is disposed on the bottom face and configured to emit light away from the bottom face.

20 Claims, 9 Drawing Sheets

(56) References Cited

U.S. PATENT DOCUMENTS

| | | |
|---|---|---|
| 5,834,893 A | 11/1998 | Bulovic et al. |
| 5,844,363 A | 12/1998 | Gu et al. |
| 6,013,982 A | 1/2000 | Thompson et al. |
| 6,087,196 A | 7/2000 | Sturm et al. |
| 6,091,195 A | 7/2000 | Forrest et al. |
| 6,097,147 A | 8/2000 | Baldo et al. |
| 6,294,398 B1 | 9/2001 | Kim et al. |
| 6,303,238 B1 | 10/2001 | Thompson et al. |
| 6,337,102 B1 | 1/2002 | Forrest et al. |
| 6,468,819 B1 | 10/2002 | Kim et al. |
| 7,279,704 B2 | 10/2007 | Walters et al. |
| 7,431,968 B1 | 10/2008 | Shtein et al. |
| 7,968,146 B2 | 6/2011 | Wagner et al. |
| 2003/0230980 A1 | 12/2003 | Forrest et al. |
| 2004/0174116 A1 | 9/2004 | Lu et al. |
| 2011/0157893 A1* | 6/2011 | Ngai .................. F21S 2/00 362/249.02 |

OTHER PUBLICATIONS

Baldo, et al., "Very high-efficiency green organic light-emitting devices based on electrophosphorescence", Applied Physics Letters, vol. 75, No. 1, pp. 4-6, Jul. 5, 1999.

actuel; OSRAM; http://www.osram.nl/media/resource/HIRES/344246/-actueel-maart-2013-fr.pdf; Mar. 2013; pp. 15; printed Mar. 26, 2015 (with English translation).

Benwirth licht GmbH; http://www.benwirth.de/Lampen_HTML/ClusterPlus_eng.html; printed Mar. 26, 2015.

OSRAM OLED GmbH; http://www.osram.com.au/osram_au/news-and-knowledge/oled-home/oled-design-luminaires/airabesc/index.jsp; printed Mar. 26, 2015.

\* cited by examiner

INTEGRATED LED/OLED LIGHTING SYSTEM

CROSS-REFERENCE TO RELATED APPLICATIONS

This application is a continuation of U.S. Patent Application Ser. No. 61/971,654, filed Mar. 28, 2014, the entire contents of which is incorporated herein by reference.

PARTIES TO A JOINT RESEARCH AGREEMENT

The claimed invention was made by, on behalf of, and/or in connection with one or more of the following parties to a joint university corporation research agreement: Regents of the University of Michigan, Princeton University, University of Southern California, and the Universal Display Corporation. The agreement was in effect on and before the date the claimed invention was made, and the claimed invention was made as a result of activities undertaken within the scope of the agreement.

FIELD OF THE INVENTION

The present invention relates to lighting units, assemblies, and devices such as organic light emitting diodes and other devices, including the same.

BACKGROUND

Opto-electronic devices that make use of organic materials are becoming increasingly desirable for a number of reasons. Many of the materials used to make such devices are relatively inexpensive, so organic opto-electronic devices have the potential for cost advantages over inorganic devices. In addition, the inherent properties of organic materials, such as their flexibility, may make them well suited for particular applications such as fabrication on a flexible substrate. Examples of organic opto-electronic devices include organic light emitting devices (OLEDs), organic phototransistors, organic photovoltaic cells, and organic photodetectors. For OLEDs, the organic materials may have performance advantages over conventional materials. For example, the wavelength at which an organic emissive layer emits light may generally be readily tuned with appropriate dopants.

OLEDs make use of thin organic films that emit light when voltage is applied across the device. OLEDs are becoming an increasingly interesting technology for use in applications such as flat panel displays, illumination, and backlighting. Several OLED materials and configurations are described in U.S. Pat. Nos. 5,844,363, 6,303,238, and 5,707,745, which are incorporated herein by reference in their entirety.

One application for phosphorescent emissive molecules is a full color display. Industry standards for such a display call for pixels adapted to emit particular colors, referred to as "saturated" colors. In particular, these standards call for saturated red, green, and blue pixels. Color may be measured using CIE coordinates, which are well known to the art.

One example of a green emissive molecule is tris(2-phenylpyridine) iridium, denoted Ir(ppy)$_3$, which has the following structure:

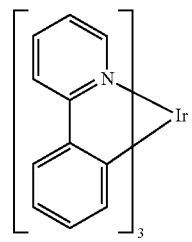

In this, and later figures herein, we depict the dative bond from nitrogen to metal (here, Ir) as a straight line.

As used herein, the term "organic" includes polymeric materials as well as small molecule organic materials that may be used to fabricate organic opto-electronic devices. "Small molecule" refers to any organic material that is not a polymer, and "small molecules" may actually be quite large. Small molecules may include repeat units in some circumstances. For example, using a long chain alkyl group as a substituent does not remove a molecule from the "small molecule" class. Small molecules may also be incorporated into polymers, for example as a pendent group on a polymer backbone or as a part of the backbone. Small molecules may also serve as the core moiety of a dendrimer, which consists of a series of chemical shells built on the core moiety. The core moiety of a dendrimer may be a fluorescent or phosphorescent small molecule emitter. A dendrimer may be a "small molecule," and it is believed that all dendrimers currently used in the field of OLEDs are small molecules.

As used herein, "top" means furthest away from the substrate, while "bottom" means closest to the substrate. Where a first layer is described as "disposed over" a second layer, the first layer is disposed further away from substrate. There may be other layers between the first and second layer, unless it is specified that the first layer is "in contact with" the second layer. For example, a cathode may be described as "disposed over" an anode, even though there are various organic layers in between.

As used herein, "solution processible" means capable of being dissolved, dispersed, or transported in and/or deposited from a liquid medium, either in solution or suspension form.

A ligand may be referred to as "photoactive" when it is believed that the ligand directly contributes to the photoactive properties of an emissive material. A ligand may be referred to as "ancillary" when it is believed that the ligand does not contribute to the photoactive properties of an emissive material, although an ancillary ligand may alter the properties of a photoactive ligand.

As used herein, and as would be generally understood by one skilled in the art, a first "Highest Occupied Molecular Orbital" (HOMO) or "Lowest Unoccupied Molecular Orbital" (LUMO) energy level is "greater than" or "higher than" a second HOMO or LUMO energy level if the first energy level is closer to the vacuum energy level. Since ionization potentials (IP) are measured as a negative energy relative to a vacuum level, a higher HOMO energy level corresponds to an IP having a smaller absolute value (an IP that is less negative). Similarly, a higher LUMO energy level corresponds to an electron affinity (EA) having a smaller absolute value (an EA that is less negative). On a conventional energy level diagram, with the vacuum level at the top, the LUMO energy level of a material is higher than the HOMO energy level of the same material. A "higher"

HOMO or LUMO energy level appears closer to the top of such a diagram than a "lower" HOMO or LUMO energy level.

As used herein, and as would be generally understood by one skilled in the art, a first work function is "greater than" or "higher than" a second work function if the first work function has a higher absolute value. Because work functions are generally measured as negative numbers relative to vacuum level, this means that a "higher" work function is more negative. On a conventional energy level diagram, with the vacuum level at the top, a "higher" work function is illustrated as further away from the vacuum level in the downward direction. Thus, the definitions of HOMO and LUMO energy levels follow a different convention than work functions.

More details on OLEDs, and the definitions described above, can be found in U.S. Pat. No. 7,279,704, which is incorporated herein by reference in its entirety.

SUMMARY OF THE INVENTION

According to an embodiment, a light unit includes a frame having a top face and a bottom face, where the bottom face may at least partially overlap the top face. A non-OLED light source, such as a non-organic LED, may be disposed on the top face and may be configured to emit light away from the top face. An OLED light source may be disposed on the bottom face and may be configured to emit light away from the bottom face. The OLED light source may block some or all of light emitted by the non-OLED source. The frame may include additional components, such as a circuit board disposed within the frame. Each light source may be tunable, such as to emit a selected color or brightness of light. When a light unit as disclosed herein is affixed to a surface, such as a wall or ceiling, light emitted by the OLED may be directly visible, whereas at least some light emitted by the non-OLED source may be blocked from direct view by the light unit. Light emitted by the non-OLED source may be indirectly visible after reflection from the surface. A light unit frame as disclosed herein may be any shape, such as an ellipse, a triangle, a rectangle, a trapezoid, a rhombus, a pentagon, a hexagon, and a heptagon.

According to an embodiment, an assembly includes a housing that provides one or more unit receptacles. At least one light unit may be disposed in a unit receptacle. The light unit may include a frame having a top face and a bottom face, where the top face may at least partially overlap the bottom face. A non-OLED light source may be disposed on the top face and configured emit light away from the top face, while an OLED light source may be disposed on the bottom face and may be configured to emit light away from the bottom face. A passive unit, such as a unit containing a transparent material, may be disposed in a unit receptacle.

In various embodiments disclosed herein, the OLED light source may block some or all of light emitted by the non-OLED source. The frame may include additional components, such as a circuit board disposed within the frame. Each light source may be tunable, such as to emit a selected color or brightness of light. When a light unit as disclosed herein is affixed to a surface, such as a wall or ceiling, light emitted by the OLED may be directly visible, whereas at least some light emitted by the non-OLED source may be blocked from direct view by the light unit. Light emitted by the non-OLED source may be indirectly visible after reflection from the surface. A light unit frame as disclosed herein may be any shape, such as an ellipse, a triangle, a rectangle, a trapezoid, a rhombus, a pentagon, a hexagon, and a heptagon.

According to another embodiment, a first device comprising a first organic light emitting device is also provided. The first organic light emitting device can include an anode, a cathode, and an organic layer, disposed between the anode and the cathode. The first device can be a consumer product, an organic light-emitting device, and/or a lighting panel.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Generally, an OLED comprises at least one organic layer disposed between and electrically connected to an anode and a cathode. When a current is applied, the anode injects holes and the cathode injects electrons into the organic layer(s). The injected holes and electrons each migrate toward the oppositely charged electrode. When an electron and hole localize on the same molecule, an "exciton," which is a localized electron-hole pair having an excited energy state, is formed. Light is emitted when the exciton relaxes via a photoemissive mechanism. In some cases, the exciton may be localized on an excimer or an exciplex. Non-radiative mechanisms, such as thermal relaxation, may also occur, but are generally considered undesirable.

The initial OLEDs used emissive molecules that emitted light from their singlet states ("fluorescence") as disclosed, for example, in U.S. Pat. No. 4,769,292, which is incorporated by reference in its entirety. Fluorescent emission generally occurs in a time frame of less than 10 nanoseconds.

More recently, OLEDs having emissive materials that emit light from triplet states ("phosphorescence") have been demonstrated. Baldo et al., "Highly Efficient Phosphorescent Emission from Organic Electroluminescent Devices," Nature, vol. 395, 151-154, 1998; ("Baldo-I") and Baldo et al., "Very high-efficiency green organic light-emitting devices based on electrophosphorescence," Appl. Phys.

Lett., vol. 75, No. 3, 4-6 (1999) ("Baldo-II"), which are incorporated by reference in their entireties. Phosphorescence is described in more detail in U.S. Pat. No. 7,279,704 at cols. 5-6, which are incorporated by reference.

Figure 1:
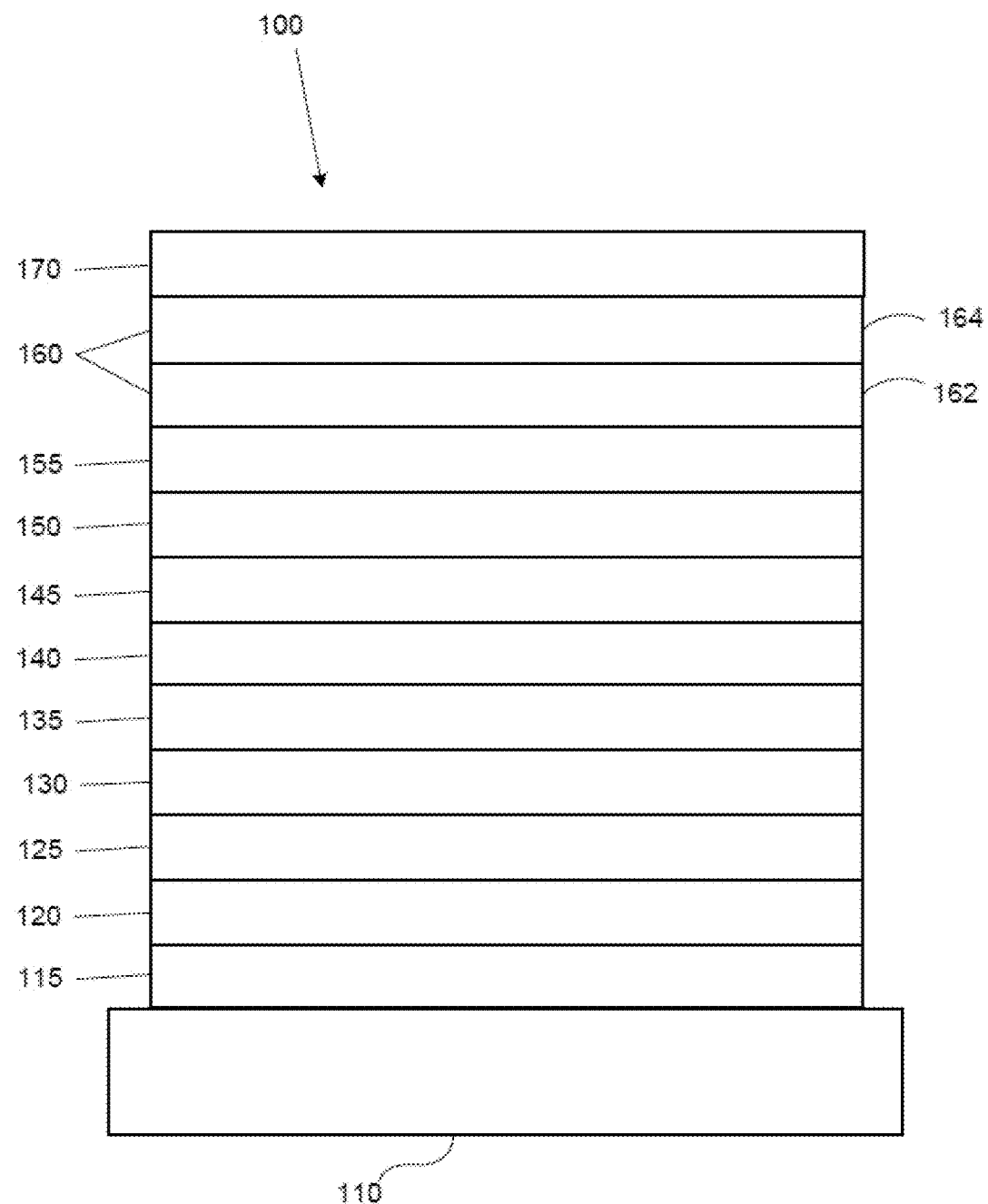
FIG. 1 shows an organic light emitting device.

FIG. 1 shows an organic light emitting device 100. The figures are not necessarily drawn to scale. Device 100 may include a substrate 110, an anode 115, a hole injection layer 120, a hole transport layer 125, an electron blocking layer 130, an emissive layer 135, a hole blocking layer 140, an electron transport layer 145, an electron injection layer 150, a protective layer 155, a cathode 160, and a barrier layer 170. Cathode 160 is a compound cathode having a first conductive layer 162 and a second conductive layer 164. Device 100 may be fabricated by depositing the layers described, in order. The properties and functions of these various layers, as well as example materials, are described in more detail in U.S. Pat. No. 7,279,704 at cols. 6-10, which are incorporated by reference.

More examples for each of these layers are available. For example, a flexible and transparent substrate-anode combination is disclosed in U.S. Pat. No. 5,844,363, which is incorporated by reference in its entirety. An example of a p-doped hole transport layer is m-MTDATA doped with F4-TCNQ at a molar ratio of 50:1, as disclosed in U.S. Patent Application Publication No. 2003/0230980, which is incorporated by reference in its entirety. Examples of emissive and host materials are disclosed in U.S. Pat. No. 6,303,238 to Thompson et al., which is incorporated by reference in its entirety. An example of an n-doped electron transport layer is BPhen doped with Li at a molar ratio of 1:1, as disclosed in U.S. Patent Application Publication No. 2003/0230980, which is incorporated by reference in its entirety. U.S. Pat. Nos. 5,703,436 and 5,707,745, which are incorporated by reference in their entireties, disclose examples of cathodes including compound cathodes having a thin layer of metal such as Mg:Ag with an overlying transparent, electrically-conductive, sputter-deposited ITO layer. The theory and use of blocking layers is described in more detail in U.S. Pat. No. 6,097,147 and U.S. Patent Application Publication No. 2003/0230980, which are incorporated by reference in their entireties. Examples of injection layers are provided in U.S. Patent Application Publication No. 2004/0174116, which is incorporated by reference in its entirety. A description of protective layers may be found in U.S. Patent Application Publication No. 2004/0174116, which is incorporated by reference in its entirety.

Figure 2:
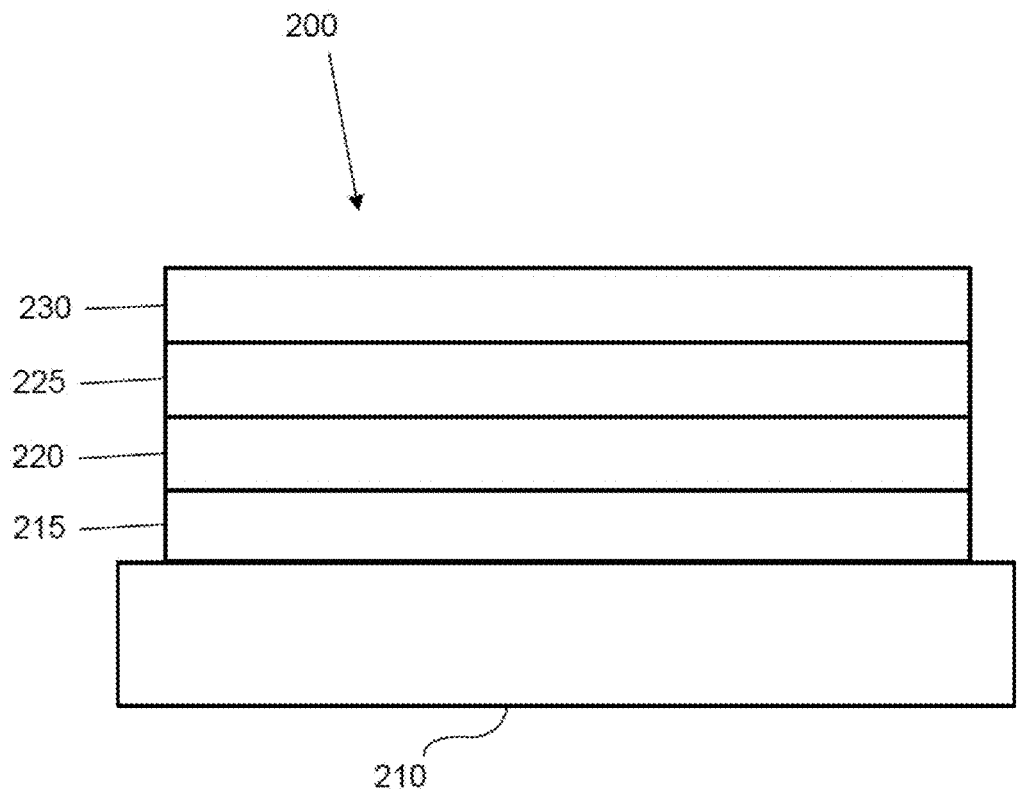
FIG. 2 shows an inverted organic light emitting device that does not have a separate electron transport layer.

FIG. 2 shows an inverted OLED 200. The device includes a substrate 210, a cathode 215, an emissive layer 220, a hole transport layer 225, and an anode 230. Device 200 may be fabricated by depositing the layers described, in order. Because the most common OLED configuration has a cathode disposed over the anode, and device 200 has cathode 215 disposed under anode 230, device 200 may be referred to as an "inverted" OLED. Materials similar to those described with respect to device 100 may be used in the corresponding layers of device 200. FIG. 2 provides one example of how some layers may be omitted from the structure of device 100.

The simple layered structure illustrated in FIGS. 1 and 2 is provided by way of non-limiting example, and it is understood that embodiments of the invention may be used in connection with a wide variety of other structures. The specific materials and structures described are exemplary in nature, and other materials and structures may be used. Functional OLEDs may be achieved by combining the various layers described in different ways, or layers may be omitted entirely, based on design, performance, and cost factors. Other layers not specifically described may also be included. Materials other than those specifically described may be used. Although many of the examples provided herein describe various layers as comprising a single material, it is understood that combinations of materials, such as a mixture of host and dopant, or more generally a mixture, may be used. Also, the layers may have various sublayers. The names given to the various layers herein are not intended to be strictly limiting. For example, in device 200, hole transport layer 225 transports holes and injects holes into emissive layer 220, and may be described as a hole transport layer or a hole injection layer. In one embodiment, an OLED may be described as having an "organic layer" disposed between a cathode and an anode. This organic layer may comprise a single layer, or may further comprise multiple layers of different organic materials as described, for example, with respect to FIGS. 1 and 2.

Structures and materials not specifically described may also be used, such as OLEDs comprised of polymeric materials (PLEDs) such as disclosed in U.S. Pat. No. 5,247, 190 to Friend et al., which is incorporated by reference in its entirety. By way of further example, OLEDs having a single organic layer may be used. OLEDs may be stacked, for example as described in U.S. Pat. No. 5,707,745 to Forrest et al, which is incorporated by reference in its entirety. The OLED structure may deviate from the simple layered structure illustrated in FIGS. 1 and 2. For example, the substrate may include an angled reflective surface to improve outcoupling, such as a mesa structure as described in U.S. Pat. No. 6,091,195 to Forrest et al., and/or a pit structure as described in U.S. Pat. No. 5,834,893 to Bulovic et al., which are incorporated by reference in their entireties.

Unless otherwise specified, any of the layers of the various embodiments may be deposited by any suitable method. For the organic layers, preferred methods include thermal evaporation, ink-jet, such as described in U.S. Pat. Nos. 6,013,982 and 6,087,196, which are incorporated by reference in their entireties, organic vapor phase deposition (OVPD), such as described in U.S. Pat. No. 6,337,102 to Forrest et al., which is incorporated by reference in its entirety, and deposition by organic vapor jet printing (OVJP), such as described in U.S. Pat. No. 7,431,968, which is incorporated by reference in its entirety. Other suitable deposition methods include spin coating and other solution based processes. Solution based processes are preferably carried out in nitrogen or an inert atmosphere. For the other layers, preferred methods include thermal evaporation. Preferred patterning methods include deposition through a mask, cold welding such as described in U.S. Pat. Nos. 6,294,398 and 6,468,819, which are incorporated by reference in their entireties, and patterning associated with some of the deposition methods such as ink jet and OVJD. Other methods may also be used. The materials to be deposited may be modified to make them compatible with a particular deposition method. For example, substituents such as alkyl and aryl groups, branched or unbranched, and preferably containing at least 3 carbons, may be used in small molecules to enhance their ability to undergo solution processing. Substituents having 20 carbons or more may be used, and 3-20 carbons is a preferred range. Materials with asymmetric structures may have better solution processibility than those having symmetric structures, because asymmetric materials may have a lower tendency to recrystallize. Dendrimer substituents may be used to enhance the ability of small molecules to undergo solution processing.

Devices fabricated in accordance with embodiments of the present invention may further optionally comprise a barrier layer. One purpose of the barrier layer is to protect the electrodes and organic layers from damaging exposure to harmful species in the environment including moisture, vapor and/or gases, etc. The barrier layer may be deposited over, under or next to a substrate, an electrode, or over any other parts of a device including an edge. The barrier layer may comprise a single layer, or multiple layers. The barrier layer may be formed by various known chemical vapor deposition techniques and may include compositions having a single phase as well as compositions having multiple phases. Any suitable material or combination of materials may be used for the barrier layer. The barrier layer may incorporate an inorganic or an organic compound or both. The preferred barrier layer comprises a mixture of a polymeric material and a non-polymeric material as described in U.S. Pat. No. 7,968,146, PCT Pat. Application Nos. PCT/US2007/023098 and PCT/US2009/042829, which are herein incorporated by reference in their entireties. To be considered a "mixture", the aforesaid polymeric and non-polymeric materials comprising the barrier layer should be deposited under the same reaction conditions and/or at the same time. The weight ratio of polymeric to non-polymeric material may be in the range of 95:5 to 5:95. The polymeric material and the non-polymeric material may be created from the same precursor material. In one example, the mixture of a polymeric material and a non-polymeric material consists essentially of polymeric silicon and inorganic silicon.

Devices fabricated in accordance with embodiments of the invention can be incorporated into a wide variety of electronic component modules (or units) that can be incorporated into a variety of electronic products or intermediate components. Examples of such electronic products or intermediate components include display screens, lighting devices such as discrete light source devices or lighting panels, etc. that can be utilized by the end-user product manufacturers. Such electronic component modules can optionally include the driving electronics and/or power source(s). Devices fabricated in accordance with embodiments of the invention can be incorporated into a wide variety of consumer products that have one or more of the electronic component modules (or units) incorporated therein. Such consumer products would include any kind of products that include one or more light source(s) and/or one or more of some type of visual displays. Some examples of such consumer products include flat panel displays, computer monitors, medical monitors, televisions, billboards, lights for interior or exterior illumination and/or signaling, heads-up displays, fully or partially transparent displays, flexible displays, laser printers, telephones, cell phones, tablets, phablets, personal digital assistants (PDAs), laptop computers, digital cameras, camcorders, viewfinders, microdisplays, 3-D displays, vehicles, a large area wall, theater or stadium screen, or a sign. Various control mechanisms may be used to control devices fabricated in accordance with the present invention, including passive matrix and active matrix. Many of the devices are intended for use in a temperature range comfortable to humans, such as 18 C to 30 C, and more preferably at room temperature (20-25 C), but could be used outside this temperature range, for example, from −40 C to +80 C.

Luminaires that illuminate a work surface, such as hanging pendant lamps, often produce a combination of direct light and indirect light. Direct light may directly illuminate a work surface. The source of direct light may fall within the site line of a user, and therefore it is often desirable for direct light to be low-glare. Techniques for generating low glare from a light source incorporated into a luminaire often require undesirable additional components such as baffles. Indirect light may directly illuminate indirect surfaces, which may be any surface other that the work surface, such as a ceiling. Indirect light can illuminate a work surface, but only after reflecting off another surface. Indirect light is often used to illuminate everything around a work surface. Point sources are often effective at providing indirect lighting because they can be simpler to focus on indirect surfaces. However, focusing a point source disposed within a luminaire requires unwanted additional components, such as reflectors or secondary optics. Therefore it is desirable to combine, in a luminaire or component thereof, the features of low-glare, direct light and indirect lighting from a point source, without additional components.

In addition, color plays a significant role in the emotional perception of a space. For instance, humans generally find blues and greens calming, whereas reds and yellows are often described as energizing. The perceptual benefit of colored lighting is especially apparent when the color is diffused throughout a space. Colored indirect lighting can reflect off of one or more indirect surfaces and effectively produce a diffuse and atmospheric colored light environment. Rooms, however, are often used for multiple purposes at multiple times throughout the day. At a certain time of day during a work circumstance, it may be beneficial to inhabit an energetic light environment; whereas at another time of day during a leisure event, it may be beneficial to inhabit a more relaxed, calming environment. Therefore it is desirable to be able to tune the color of indirect lighting depending on circumstances such as the time of day, available light from uncontrolled sources (ambient lighting), and use of the space.

In addition to color, the ratio of intensities of direct light to indirect light can dramatically change the perception of a space. A high ratio of direct light to indirect light can focus attention on the work surface, creating an impression of intensity and intimacy for occupants. Decreasing the ratio of direct light to indirect light deemphasizes the work surface, draws attention to the periphery of a room, and creates a feeling of subdued activity or calm. For example, a lower ratio of direct light to indirect light can enable occupants to increase attention and focus on a presentation screen instead of a conference table. A relatively balanced ratio of direct light to indirect light can produce a more comfortable environment and encourage openness and collaboration among occupants. Therefore it is desirable to be able to tune the ratio of intensities of direct light to indirect light.

OLEDs are particularly well suited to provide direct light, because OLEDs can provide low-glare light without additional components that can effect efficiency or add thickness to a luminaire. As previously described, FIGS. 1 and 2 each show views of example OLEDs that may be incorporated into light units and assemblies as described in this disclosure. In contrast, non-organic light emitting diodes (LEDs) may be more effective at providing indirect light because they can serve as point sources without the need for additional focusing components. According to embodiments disclosed herein, direct OLED lighting and indirect LED lighting may be combined into a single luminaire or component thereof to provide low-glare direct light and point-sourced indirect light.

Figure 3:
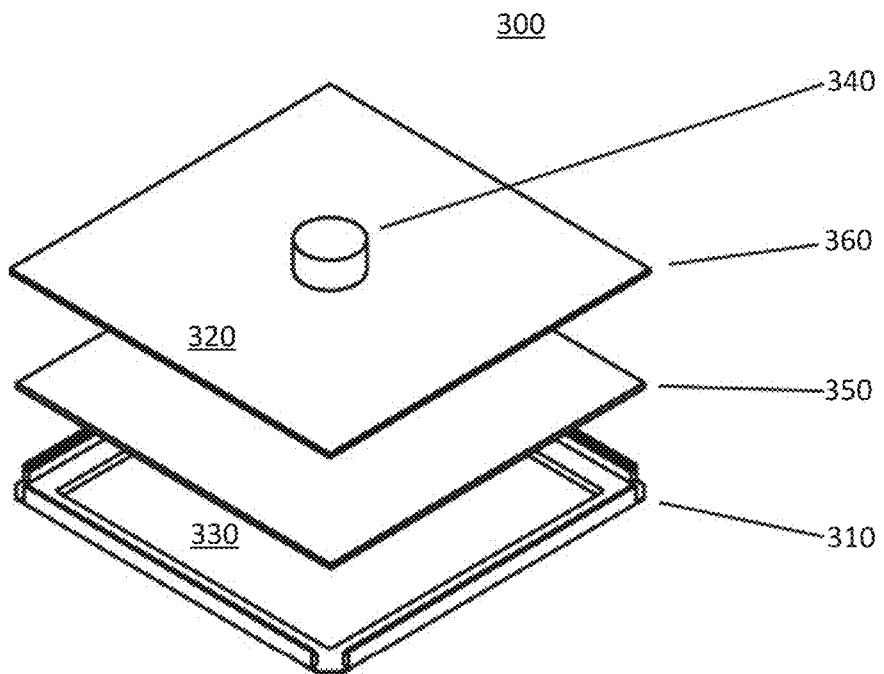
FIG. 3 shows an exploded view of a light unit.

FIG. 3 shows an exploded view of a light unit 300 according to an embodiment. The light unit may be constructed of a frame 310 that has a top face 320 and a bottom face 330. A region "below the light unit" refers to the region of space on the same side of a plane defined by the bottom face of the light unit. Similarly, an area "above the light unit" refers to the region on the same side of a plane defined by the top face of the light unit. The bottom face may at least partially overlap the top face. At least a partial overlap may be advantageous because in some circumstances, such as where the light unit is illuminating a work surface, it is often desirable to block higher-glare light emitted from the top face with the bottom face. A partial overlap also allows for a smaller, more efficient luminaire.

Figure 4:
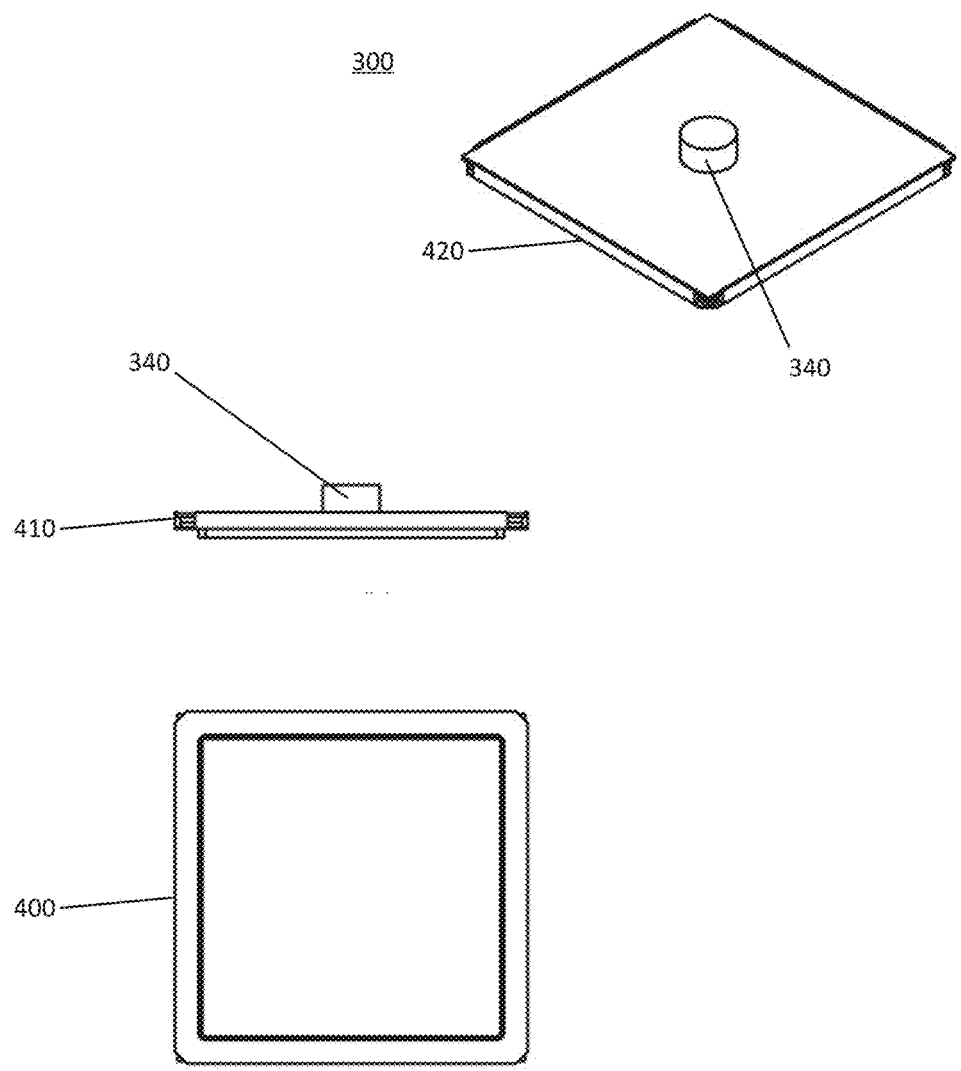
FIG. 4 shows a bottom view, a side view, and an isometric view of a light unit.

A non-OLED light source 340 may be disposed on the top face and may be configured to emit light away from the top face. An OLED light source 350 may be disposed on the bottom face and may be configured to emit light away from the bottom face. The OLED light source may be configured to block a portion of light emitted by the non-OLED light source. For example, when viewed from below the light source, the OLED source may prevent light emitted by the non-OLED source from being directly viewed. The non-OLED light source and the OLED light source may be controlled, at least in part, by a circuit board 360 disposed within the frame. FIG. 4 shows, according to an embodiment, a bottom view 400, a side view 410, and isometric view 420 of the light unit 300.

The non-OLED light source may be one or more of any non-OLED light sources recognized by a person of skill in the art, including LED light sources, electron stimulated luminescence light bulbs, incandescent light bulbs, halogen lamps, induction lamps, arc lamps, and gas discharge lamps, such as fluorescent lamps and neon lamps. Embodiments in which the non-OLED light source is an LED may be advantageous, because the LED light source may be disposed on top of the OLED light source without substantially increasing the thickness of the luminaire. This may save space and allow such a luminaire to be installed in locations and arrangements not available to other types of non-OLED light sources such as shallow wall or ceiling recesses, in close proximity to a surface such as a ceiling, or the like. Further, LEDs are also often more energy efficient and may radiate less heat than other non-OLED light sources, which allows them to be installed in heat sensitive environments or in close proximity to flammable materials.

The OLED light source and the non-OLED light source may each be tunable to emit certain characteristics, such as a selected color of light or a selected brightness. The circuit board 360 may control, at least in part, tuning functionality of the light unit. The color and brightness characteristics of OLED and non-OLED light sources may be tuned by any of the range of applicable techniques recognized by a person of skill in the art, including spectral tuning, multiple circuit modules, multiple stacked emission units driven by direct current or alternating current signals, and voltage driven techniques that take advantage of mechanisms such as voltage-dependent charge trapping, spatial shifts of the recombination zone, modified exciton distributions, or exciton quenching at high current densities. By employing such techniques, luminaires implementing embodiments of this disclosure may be tunable to create varied light environments in a single space, such as warm energizing work environments or cool calming stress-relieving environments. Furthermore, the ratios of intensity of direct to indirect lighting may be increased when occupants in the space are operating at a work surface, and decreased when occupants are attending to a presentation or other event unrelated to the work surface.

A surface of the frame of a light unit as disclosed herein may define any desirable forms for a lighting unit, including two dimensional non-polygons such as ellipses, circles, and curved regions and two dimensional polygons such as triangles, rectangles, squares, trapezoids, rhombi, pentagons, hexagons, heptagons, and so forth. Other applicable surfaces may be used, such as a three dimensional surface with a boundary.

Figure 5:
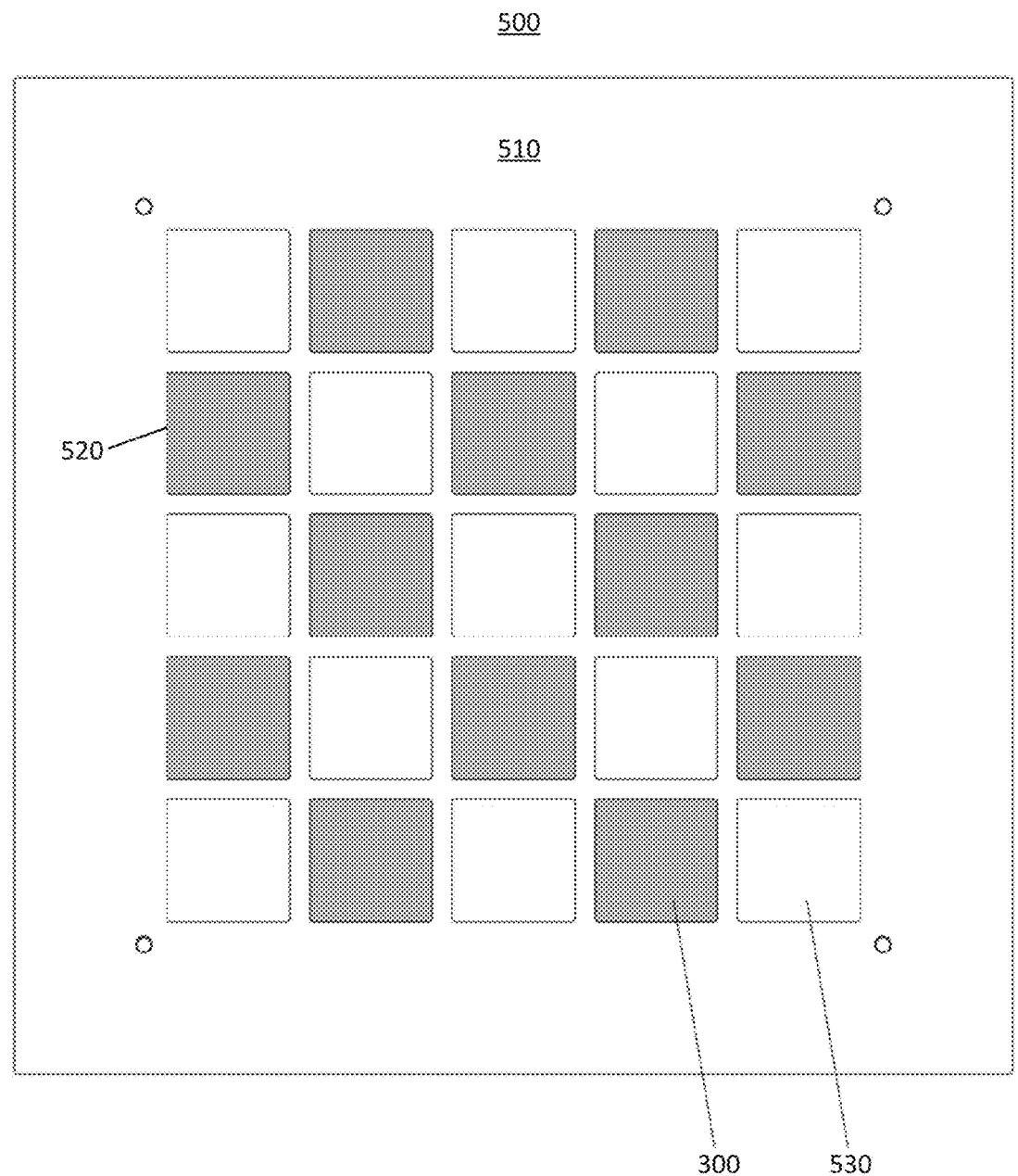
FIG. 5 shows a bottom view of an assembly with light units.
Figure 6:
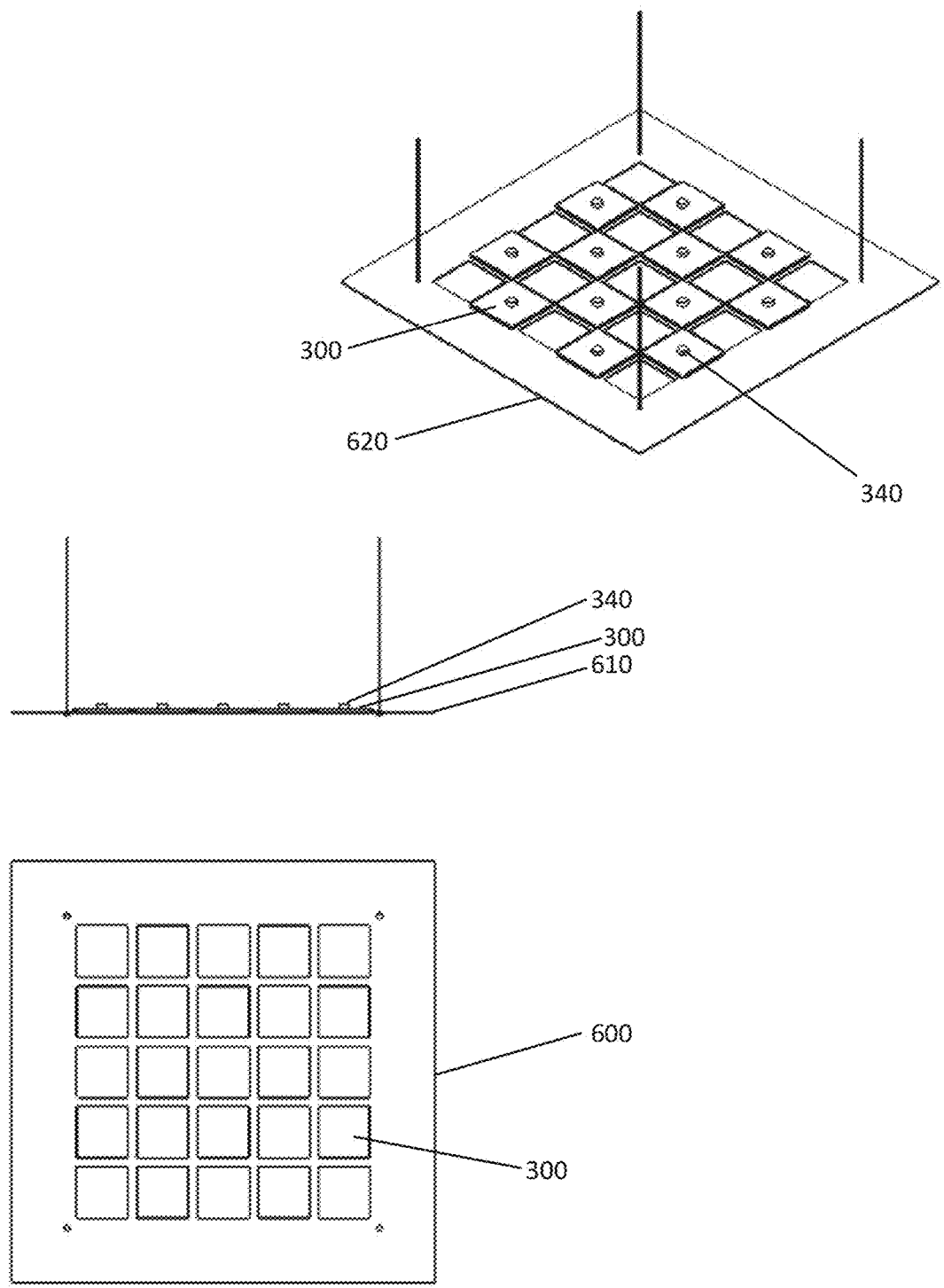
FIG. 6 shows a bottom view, a side view, and an isometric view of an assembly with light units.
Figure 7:
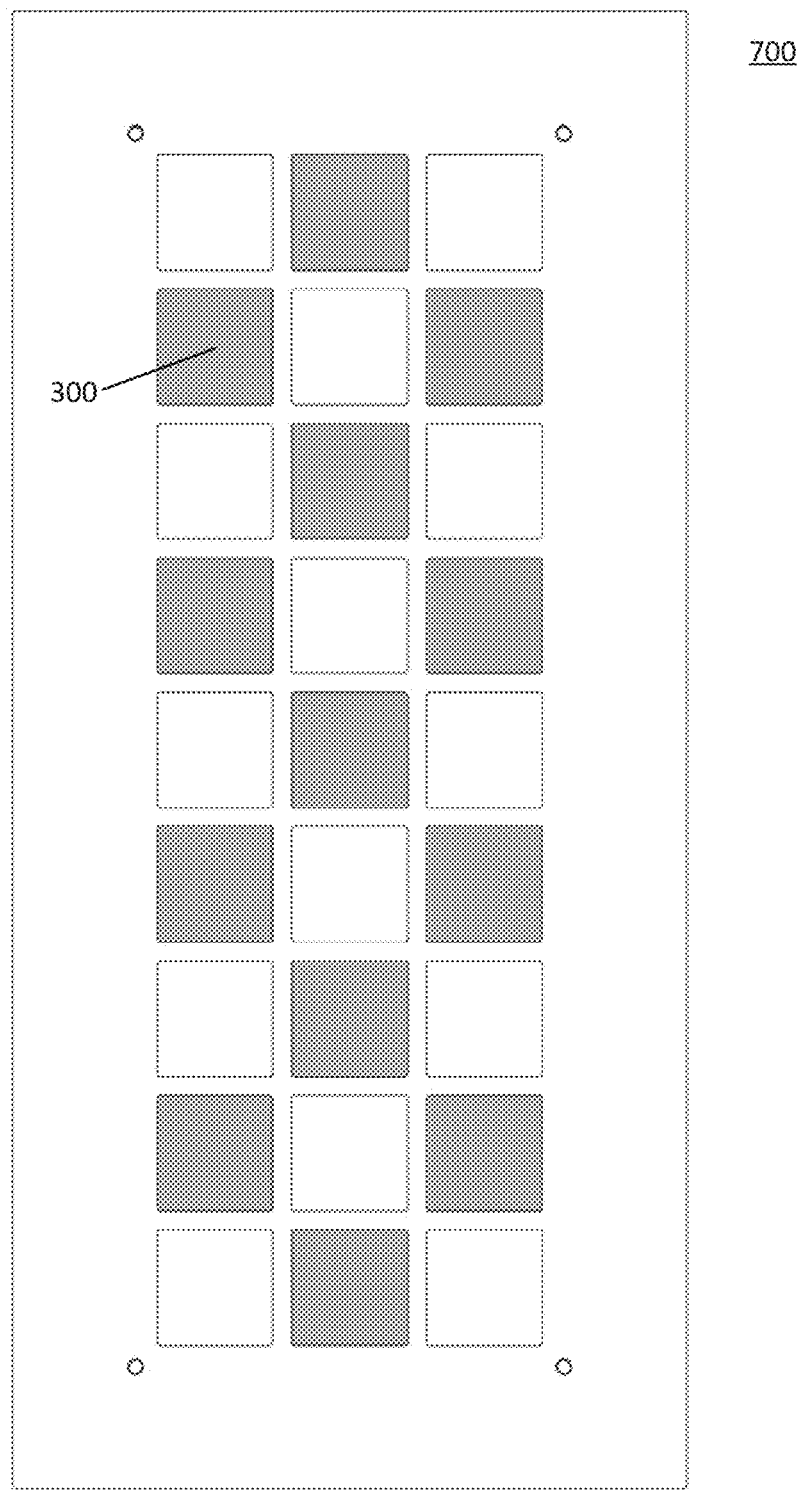
FIG. 7 shows a bottom view of a rectangular assembly with light units.

FIG. 5 shows a bottom view of an assembly 500 with light units according to an embodiment. The assembly may have a housing 510, which may include one or more unit receptacles 520 and at least one light unit 300 disposed in a unit receptacle. The assembly may include at least one passive unit 530 disposed in a unit receptacle. In general, a "passive unit" refers to one that does not actively emit light. Although it may not be directly emissive, a passive unit may include one or more materials that are at least partially transparent to light. As another example, a passive unit may also be an opening, such that there is no, or substantially no material within the unit receptacle and light and air may freely pass through. FIG. 6 shows, according to an embodiment, a bottom view 600, a side view 610, and an isometric view 620 of an assembly 500 with light units 300. FIG. 7 shows a bottom view of a rectangular assembly 700 with light units 300 according to an embodiment. The housing of an assembly and each unit receptacle disposed within may define a form of any of the range of applicable shapes or surfaces previously discussed with respect to the frames of the light units. In addition, multiple unit receptacles may be placed in any desirable arrangement, including in the pattern of an array within the housing as show for example in FIGS. 5-8. The arrangement may be selected based upon the intended use or purpose of the light source, or it may be selected for aesthetic purposes.

Figure 8A:
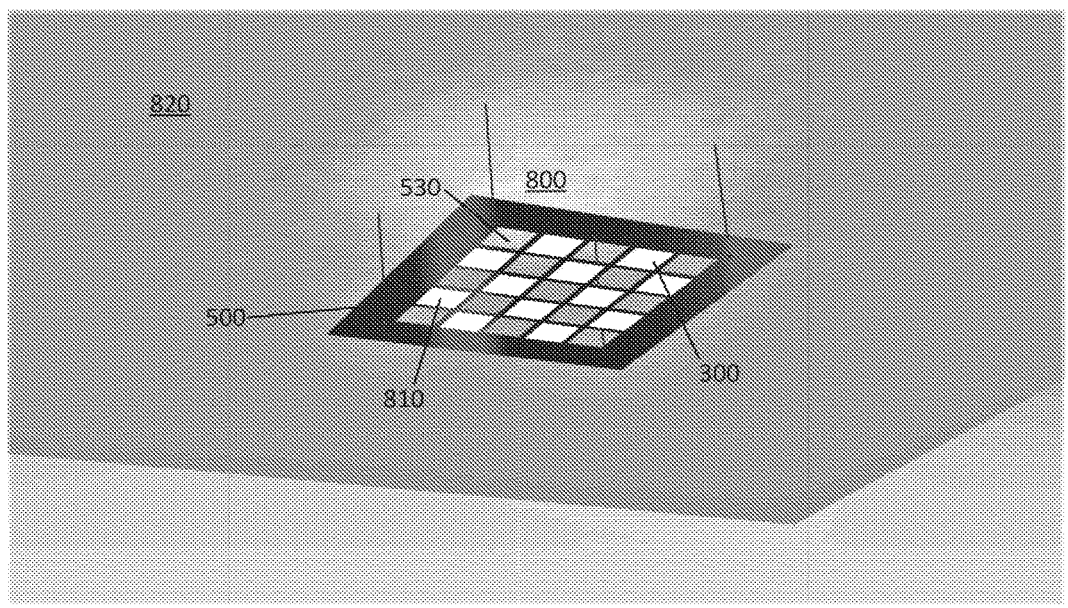
FIG. 8A shows a bottom view of an assembly with light units providing green-yellow indirect light and white direct light.
Figure 8B:
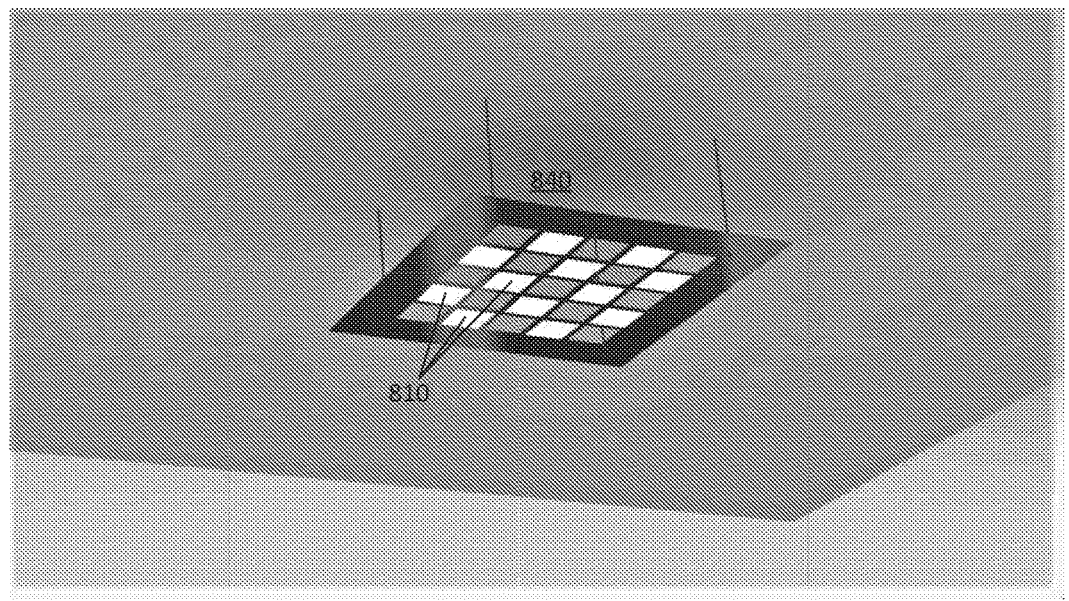
FIG. 8B shows a bottom view of an assembly with light units providing blue-violet indirect light and white direct light.

FIG. 8A shows, according to an embodiment, a bottom view of an assembly 500 with light units 300. The assembly is shown as viewed from a viewing region below the assembly. The light units may be tunable to provide green-yellow indirect light 800 and white direct light 810. The light units may be disposed in the assembly, and the assembly may be affixed to a surface 820 such that light emitted by the OLED light sources may be directly visible as white light 810. The non-OLED light sources are on the opposite side of the light units and not viewable from this perspective. A portion of the yellow-green indirect light emitted directly by the non-OLED light source may be blocked from view by the light units 300. The yellow-green indirect light 800 emitted by the non-OLED light sources is indirectly visible through passive units 530 after reflection from the surface 820. In this embodiment passive units 530 are depicted as openings. FIG. 8B shows, according to an embodiment, a bottom view of the same assembly as shown in FIG. 8A, except in this view the light units have been tuned to provide blue-violet indirect light 840 and white direct light 810.

It should be noted that luminaires embodying aspects of this disclosure may be mounted to any of the range of applicable surfaces recognized by a person of skill in the art, including walls, recesses, ceilings, posts, overhangs, thresholds, scaffoldings, chandeliers, and so forth. For example, a luminaire may be mounted to a wall such that the bottom face and top face are substantially parallel to the wall and light sources disposed on the top face emit directly towards the wall and light sources disposed on the bottom face emit directly away from the wall.

Figure 9A:
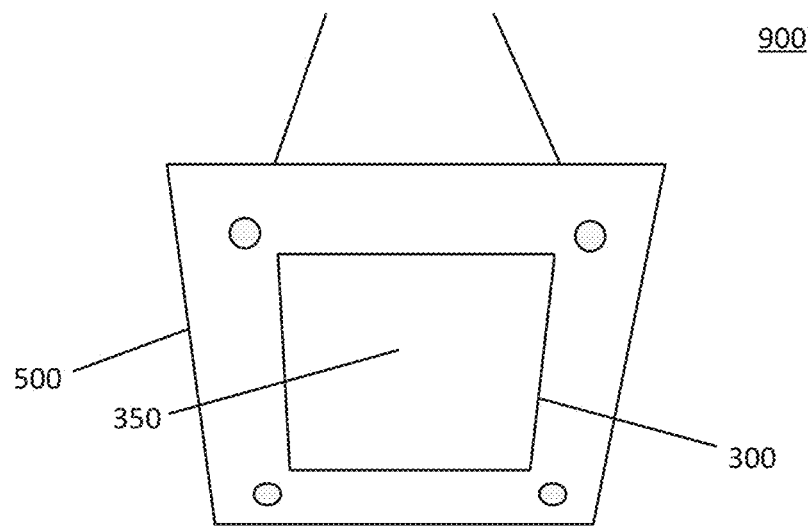
FIG. 9A shows a bottom view of an assembly with a single light unit.
Figure 9B:
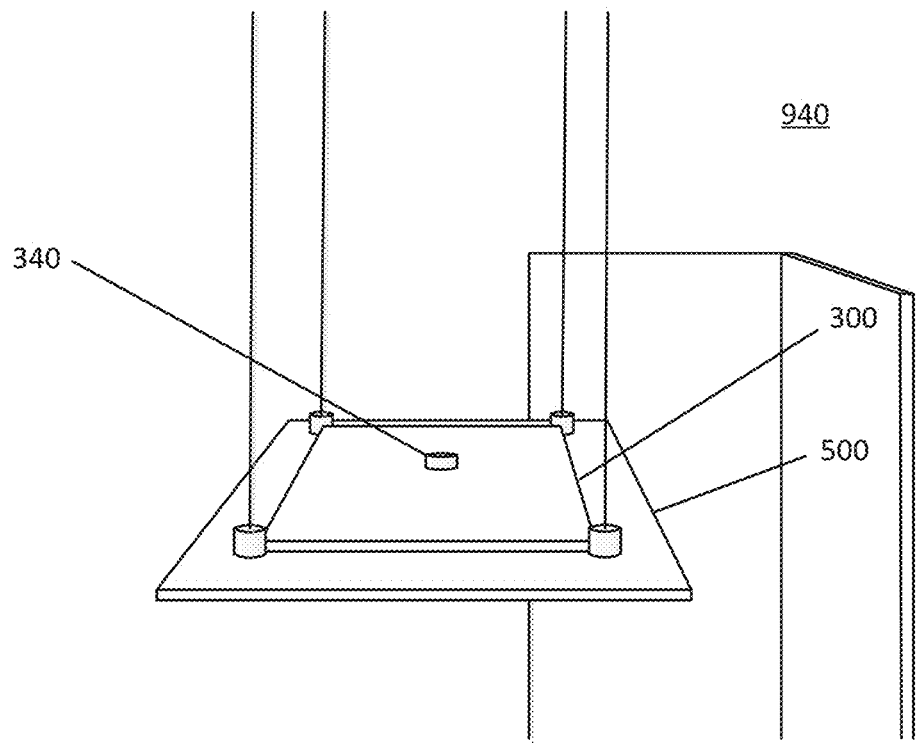
FIG. 9B shows a top view of an assembly with a single light unit.

FIG. 9A shows, according to an embodiment, a bottom view 900 of assembly 500 with a single light unit 300. In this embodiment, the light unit is depicted in a substantially larger form factor than the preceding embodiments such that the single light unit substantially fills the assembly. From this bottom view a single OLED light source 350 is visible. FIG. 9B shows, according to an embodiment, a top view 940 of the assembly 500 with the single light unit 300. This view shows the embodiment of 9A as it would appear if it were suspended from a surface such as a ceiling. From the top view, a single non-OLED light source 340 is visible on the opposite face of the OLED light source.

It should be noted that this disclosure is not limited to pairings within a single light unit of a single OLED light source with a single non-OLED light source. Rather, this disclosure also contemplates within a single light unit, multiple non-OLED light sources combined with a single OLED light source, multiple OLED light sources combine with a single non-OLED light source, and multiple non-OLED light sources combined with multiple OLED light sources. Further, a variety of these light source combinations may be implemented in multiple light units disposed within a single assembly.

Embodiments disclosed herein may provide additional aesthetic and functional effects. For example, a light unit as disclosed herein may be in a "checkerboard" arrangement, such as a grid with alternating OLED/LED units as previously described and passive units. In such an arrangement, the color of light apparent to a viewer may result from the perception of the indirect and unfiltered light from the LED, such as reflected from a ceiling, the same light after filtering through the passive units, and/or the direct light emitted by the OLED. In addition, as the color of the LED is varied, the perception of the color of the OLED panels will also change due to the visual tension created by the dynamic light of the LED in contrast to the stable OLED light.

It is understood that the various embodiments described herein are by way of example only, and are not intended to limit the scope of the invention. For example, many of the materials and structures described herein may be substituted with other materials and structures without deviating from the spirit of the invention. The present invention as claimed may therefore include variations from the particular examples and preferred embodiments described herein, as will be apparent to one of skill in the art. It is understood that various theories as to why the invention works are not intended to be limiting.

We claim:

1. A light unit, comprising:
    a frame comprising a top face and a bottom face, wherein the bottom face at least partially overlaps the top face;
    a non-OLED light source disposed on the top face and configured to emit light away from the top face; and
    an OLED light source disposed on the bottom face and configured to emit light away from the bottom face.

2. The light unit of claim 1, wherein the OLED light source is configured to block a portion of light emitted by the non-OLED light source.

3. The light unit of claim 1, comprising a circuit board disposed within the frame.

4. The light unit of claim 1, wherein the non-OLED light source comprises an LED light source.

5. The light unit of claim 1, wherein the non-OLED light source comprises an LED light source, and the LED light source is tunable to emit a characteristic comprising a selected color of light.

6. The light unit of claim 1, wherein the non-OLED light source comprises an LED light source, and the LED light source is tunable to emit a characteristic comprising a selected brightness.

7. The light unit of claim 1, wherein the OLED light source is tunable to emit a characteristic comprising a selected color of light.

8. The light unit of claim 1, wherein the OLED light source is tunable to emit a characteristic comprising a selected brightness.

9. The light unit of claim 1, wherein, when the light unit is disposed in an assembly affixed to a surface:
    light emitted by the OLED light source is directly visible;
    at least a portion of light emitted directly by the non-OLED light source is blocked from view by the light unit; and
    light emitted by the non-OLED light source is indirectly visible after reflection from the surface, when viewed from a viewing region closer to a face of the light unit on which the OLED light source is disposed than to a face of the light unit on which the non-OLED light source is disposed.

10. The light unit of claim 1, wherein the frame comprises a shape selected from the group consisting of: an ellipse, a triangle, a rectangle, a trapezoid, a rhombus, a pentagon, a hexagon, and a heptagon.

11. An assembly, comprising:
    a housing comprising one or more unit receptacles; and
    at least one light unit disposed in a unit receptacle, the at least one light unit comprising:
        a frame comprising a top face and a bottom face, wherein the top face at least partially overlaps the bottom face;
        a non-OLED light source disposed on the top face and configured emit light away from the top face; and
        an OLED light source disposed on the bottom face and configured to emit light away from the bottom face.

12. The assembly of claim 11, comprising at least one passive unit disposed in a unit receptacle, the passive unit comprising a material at least partially transparent to light.

13. The assembly of claim 11, wherein at least one unit receptacle comprises an opening.

14. The assembly of claim 11, wherein the OLED light source is configured to block a portion of light emitted by the non-OLED light source.

15. The assembly of claim 11, comprising a circuit board disposed within the frame.

16. The assembly of claim 11, wherein the non-LED light source comprises an LED light source.

17. The assembly of claim 11, wherein the non-LED light source comprises an LED light source, and the LED light source is tunable to emit a characteristic comprising at least one of the group consisting of a selected color of light and a selected brightness.

18. The assembly of claim 11, wherein the OLED light source is tunable to emit a characteristic comprising a selected color of light.

19. The assembly of claim 11, wherein the OLED light source is tunable to emit a characteristic comprising a selected brightness.

20. The assembly of claim 11, wherein, when the assembly is affixed to a surface:
    light emitted by each OLED light source is directly visible;
    at least a portion of light emitted directly by each non-OLED light source is blocked from view by the at least one light unit disposed in the unit receptacle; and
    light emitted by each non-OLED light source is indirectly visible after reflection from the surface, when viewed from a viewing region closer to a face of the at least one light unit on which the OLED light source is disposed than to a face of the at least one light unit on which the non-OLED light source is disposed.

\* \* \* \* \*